United States Patent
Sakamoto et al.

(10) Patent No.: US 11,086,160 B2
(45) Date of Patent: Aug. 10, 2021

(54) LIGHT CONTROL DEVICE

(71) Applicant: TOPPAN PRINTING CO., LTD., Taito-ku (JP)

(72) Inventors: Masanori Sakamoto, Taito-ku (JP); Shinobu Sumi, Taito-ku (JP); Wataru Ookubo, Taito-ku (JP)

(73) Assignee: TOPPAN PRINTING CO., LTD., Taito-ku (JP)

( * ) Notice: Subject to any disclaimer, the term of this patent is extended or adjusted under 35 U.S.C. 154(b) by 48 days.

(21) Appl. No.: 16/371,288

(22) Filed: Apr. 1, 2019

(65) Prior Publication Data

US 2019/0258103 A1 Aug. 22, 2019

Related U.S. Application Data

(63) Continuation of application No. PCT/JP2017/023220, filed on Jun. 23, 2017.

(51) Int. Cl.
*G06F 3/044* (2006.01)
*G06F 3/0488* (2013.01)
(Continued)

(52) U.S. Cl.
CPC ...... *G02F 1/13338* (2013.01); *G02F 1/13306* (2013.01); *G02F 1/13439* (2013.01);
(Continued)

(58) Field of Classification Search
CPC .... G06F 3/044; G06F 3/0418; G06F 3/04883; G06F 3/04166
See application file for complete search history.

(56) References Cited

U.S. PATENT DOCUMENTS

| 4,435,047 A | 3/1984 | Fergason |
| 4,688,900 A | 8/1987 | Doane et al. |

(Continued)

FOREIGN PATENT DOCUMENTS

| JP | 2000-321562 A | 11/2000 |
| JP | 2006-162823 A | 6/2006 |

(Continued)

OTHER PUBLICATIONS

International Search Report dated Sep. 5, 2017 in PCT/JP2017/023220, filed Jun. 23, 2017, 5 pages.

(Continued)

*Primary Examiner* — Ke Xiao
*Assistant Examiner* — James S Nokham
(74) *Attorney, Agent, or Firm* — Oblon, McClelland, Maier & Neustadt, L.L.P.

(57) ABSTRACT

A light control device including a light control sheet including light control units each reversibly change light transmittance and positioned according to a first arrangement that has a regularity, a detection sheet including detection units each detect external input and positioned according to a second arrangement that has a regularity same as the regularity of the first arrangement, a driving unit that outputs to each of the light control units a change signal for changing light transmittance, and a light control processing unit which associates each of the detection units with at least one of the light control units, and causes the driving unit to output the change signal to the light control unit associated with the detection unit that has detected the external input.

13 Claims, 9 Drawing Sheets

(51) Int. Cl.
*H01H 36/00* (2006.01)
*G02F 1/1333* (2006.01)
*G02F 1/133* (2006.01)
*G02F 1/1343* (2006.01)
*G06F 3/0354* (2013.01)

(52) U.S. Cl.
CPC .... *G02F 1/134309* (2013.01); *G06F 3/03547* (2013.01); *G06F 3/044* (2013.01); *G06F 3/04886* (2013.01); *H01H 36/00* (2013.01); *G06F 3/0488* (2013.01)

(56) References Cited

U.S. PATENT DOCUMENTS

| | | | | |
|---|---|---|---|---|
| 5,943,154 | A * | 8/1999 | Nakayama | G02F 1/361 |
| | | | | 359/244 |
| 2007/0074914 | A1* | 4/2007 | Geaghan | G06F 3/0445 |
| | | | | 178/18.06 |
| 2010/0085324 | A1* | 4/2010 | Noguchi | G06F 3/044 |
| | | | | 345/174 |
| 2010/0302202 | A1 | 12/2010 | Takeuchi et al. | |
| 2012/0075239 | A1* | 3/2012 | Azumi | G06F 3/0412 |
| | | | | 345/174 |
| 2012/0162144 | A1* | 6/2012 | Fahraeus | G06F 3/0418 |
| | | | | 345/178 |
| 2012/0176325 | A1 | 7/2012 | Okazaki et al. | |
| 2014/0085259 | A1* | 3/2014 | Lee | G06F 3/04883 |
| | | | | 345/174 |
| 2014/0267138 | A1* | 9/2014 | Curtis | G06F 3/044 |
| | | | | 345/174 |
| 2015/0002466 | A1 | 1/2015 | Takeuchi et al. | |
| 2015/0091861 | A1* | 4/2015 | Tanaka | G06F 3/04166 |
| | | | | 345/174 |
| 2015/0153767 | A1* | 6/2015 | Nakayama | G06F 3/0443 |
| | | | | 345/174 |
| 2015/0277657 | A1* | 10/2015 | Azumi | G09G 3/3648 |
| | | | | 345/174 |
| 2016/0011713 | A1* | 1/2016 | Kida | G06F 3/044 |
| | | | | 345/174 |
| 2017/0104858 | A1 | 4/2017 | Mizumoto | |
| 2017/0242546 | A1 | 8/2017 | Takeuchi et al. | |
| 2017/0262088 | A1* | 9/2017 | Wang | G02B 6/0065 |
| 2018/0224970 | A1* | 8/2018 | Hayashi | G06F 3/0446 |

FOREIGN PATENT DOCUMENTS

| | | |
|---|---|---|
| JP | 2012-145779 | 8/2012 |
| JP | 3188376 U | 1/2014 |
| JP | 2015-140535 A | 8/2015 |
| JP | 2016-10111 | 1/2016 |
| JP | 2016-157021 A | 9/2016 |

OTHER PUBLICATIONS

Japanese Office Action dated Dec. 10, 2019 in Japanese Patent Application No. 2018-541913 (with English translation), 6 pages.
Extended European Search Report dated Jun. 26, 2019 in Patent Application No. 17855317.8, 8 pages.

\* cited by examiner

LIGHT CONTROL DEVICE

CROSS-REFERENCE TO RELATED APPLICATIONS

The present application is a continuation of International Application No. PCT/JP2017/023220, filed Jun. 23, 2017, which is based upon and claims the benefits of priority to Japanese Application No. 2016-195111, filed Sep. 30, 2016. The entire contents of these applications are incorporated herein by reference.

BACKGROUND OF THE INVENTION

Field of the Invention

The present invention relates to a light control device including a light control sheet that reversibly changes light transmittance.

Discussion of the Background

As the type of light control sheets provided in light control devices, for example, electrochromic-type, polarizing plate-type, and liquid crystal-type light control sheets are known. Electrochromic-type light control sheets reversibly promote redox reactions depending on the size of the electric field applied to the light control sheet, and changes the light absorption rate with the progress of the redox reactions (see, for example, PTL 1). Polarizing plate-type light control sheets move two polarizing plates having different optical properties relative to each other, to change the transmittance of light passing through the two polarizing plates (see, for example, PTL 2). Liquid crystal-type light control sheets reversibly change the orientation of liquid crystal molecules between a light-scattering state and a light-transmitting state, depending on the size of the electric field applied to the liquid crystal molecules.

As the form of the liquid crystal-type light control sheets, polymer network liquid crystals (PNLC), polymer dispersed liquid crystals (PDLC), and nematic curvilinear aligned phase (NCAP) liquid crystals are known. Polymer network liquid crystals have a three-dimensional mesh polymer network, and maintain a liquid crystal composition in mutually connected voids in the polymer network (see, for example, PTL 3). Polymer dispersed liquid crystals have a large number of isolated voids in a polymer layer, and maintain a liquid crystal composition in each void dispersed in the polymer layer (see, for example, PTL 4). Nematic curvilinear aligned phase liquid crystals maintain an encapsulated liquid crystal composition in a polymer layer (see, for example, PTL 5).

As the mode for driving light control sheets, a normal mode and a reverse mode are known. Light control sheets driven in the normal mode have low light transmittance when they are not energized, and the light transmittance is increased by consumption of electric power. The normal mode with low light transmittance during non-energization is suitable, for example, for application to screens etc. that often require light-blocking properties. Light control sheets driven in the reverse mode have high light transmittance when they are not energized, and the light transmittance is reduced by consumption of electric power. The reverse mode with high light transmittance during non-energization is suitable, for example, for application to building materials etc. that require high light transmittance in an emergency (see, for example, PTL 6).

PTL 1: JP 2016-157021 A
PTL 2: JP 2015-140535 A
PTL 3: JP 2006-162823 A
PTL 4: U.S. Pat. No. 4,688,900 B
PTL 5: U.S. Pat. No. 4,435,047 B
PTL 6: JP 2000-321562 A

SUMMARY OF THE INVENTION

According to an aspect of the present invention, a light control device includes a light control sheet including light control units each reversibly change light transmittance and positioned according to a first arrangement that has a regularity, a detection sheet including detection units each detect external input and positioned according to a second arrangement that has a regularity same as the regularity of the first arrangement, a driving unit that outputs to each of the light control units a change signal for changing light transmittance, and a light control processing unit which associates each of the detection units with at least one of the light control units, and causes the driving unit to output the change signal to the light control unit associated with the detection unit that has detected the external input.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 2(a), 2(b), and 2(c) are views illustrating the action when changes in capacitance are detected by different detection units.

FIGS. 3(a), 3(b), and 3(c) are views illustrating the action when input is made sequentially downward.

FIGS. 4(a), 4(b), and 4(c) are views illustrating the action when input is made sequentially upward.

FIGS. 5(a), 5(b), and 5(c) are views illustrating the action when long-pressing is inputted as a gesture.

FIGS. 17(a) and 17(b) are views illustrating the action when input is made sequentially downward.

DESCRIPTION OF THE EMBODIMENTS

Figure 1:
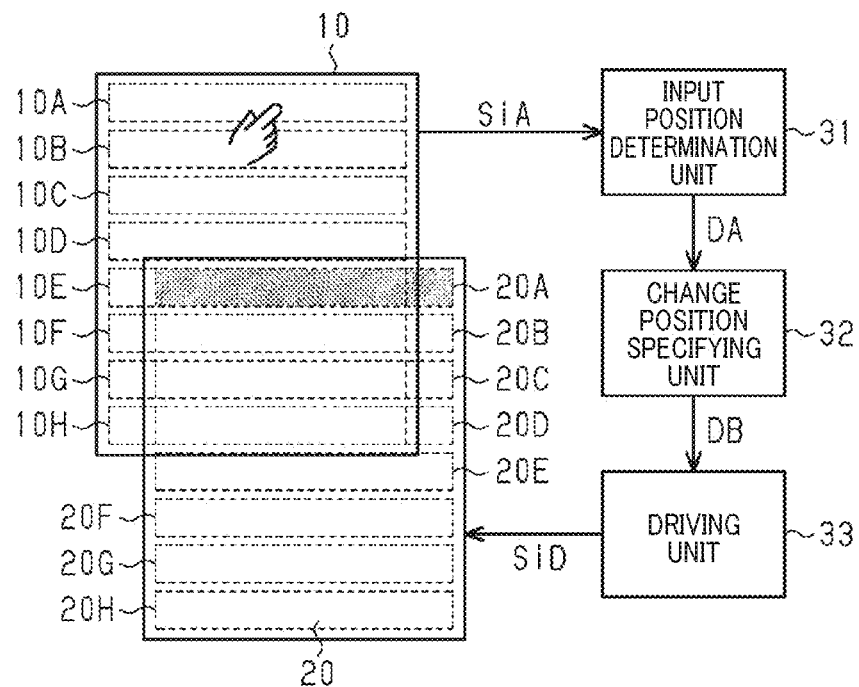
FIG. 1 illustrates the configuration of a light control device in a first embodiment.

The embodiments will now be described with reference to the accompanying drawings, wherein like reference numerals designate corresponding or identical elements throughout the various drawings.

First Embodiment

With reference to FIGS. 1 to 4(c), the first embodiment of the light control device will be described.

The light control device includes a detection sheet 10 and a light control sheet 20. The detection sheet 10 and the light control sheet 20 have light transmissivity that allows the passage of visible light. The detection sheet 10 and the light control sheet 20 have substantially the same size. The detection sheet 10 is superposed on the light control sheet 20 so that the outer edge of the detection sheet 10 and the outer edge of the light control sheet 20 substantially coincide with each other. The detection sheet 10 and the light control sheet 20 are configured as an integrated structure. That the detection sheet 10 and the light control sheet 20 have substantially the same size means that they have the same size, and also means that, for example, there is a size difference between the two sheets because the edge of at least one sheet is trimmed.

The detection sheet 10 includes a plurality of detection units 10A, 10B, 10C, 10D, 10E, 10F, 10G, and 10H. The detection units 10A to 10H are positioned in different areas of the detection sheet 10. In the different areas, no part of any one area overlaps with any other areas, and the entirety of any one area does not overlap with any other area. The detection units 10A to 10H are each configured to be able to detect changes in capacitance substantially in the whole area occupied by each detection unit. The detection units 10A to 10H each employ one of a surface-type system including a single conductive layer, and a projection-type system including two conductive layers that face each other. All of the detection units 10A to 10H may employ a single system or two systems. The detection units 10A to 10H each have a rectangular shape that extends in the lateral direction on paper. The detection units 10A to 10H have a regular arrangement in which they do not overlap with each other and are arranged at constant intervals in the longitudinal direction on paper. Hereinafter, the regular arrangement of the detection units 10A to 10H is referred to as a second arrangement.

The light control sheet 20 includes a plurality of light control units 20A, 20B, 20C, 20D, 20E, 20F, 20G, and 20H. The light control units 20A to 20H are each configured to be able to change their light transmittance for visible light. The light control units 20A to 20H are any of an electrochromic-type, a polarizing plate-type, and a liquid crystal-type (PNLC, PDLC, etc.), and employ a normal mode or a reverse mode. All of the light control units 20A to 20H may employ a single mode or two or more different modes. The light control units 20A to 20H each have a rectangular shape that extends in the lateral direction on paper. The light control units 20A to 20H have a regular arrangement in which they do not overlap with each other and are arranged at constant intervals in the longitudinal direction on paper. Hereinafter, the regular arrangement of the light control units 20A to 20H is referred to as a first arrangement. The regularity of the first arrangement is the same as the regularity of the second arrangement.

Each of the light control units 20A to 20H faces a different one of the detection units 10A to 10H. For example, the light control unit 20A faces the detection unit 10A, and the light control unit 20B faces the detection unit 10B. Moreover, the light control unit 20G faces the detection unit 10G, and the light control unit 20H faces the detection unit 10H.

The phrase that "the regularity of the Mth arrangement is the same as the regularity of the Nth arrangement" means at least one of the following: 1) the arrangement direction of elements arranged according to the Mth arrangement (hereinafter, these elements are defined as the elements M in the text) is the same as the arrangement direction of elements arranged according to the Nth arrangement (hereinafter, these elements are defined as the elements N in the text); 2) the relative size relationship of the elements M with respect to the arrangement order of the elements M is the same as the relative size relationship of the elements N with respect to the arrangement order of the elements N; and 3) the relative positional relationship of the elements M with respect to the arrangement order of the elements M is the same as the relative positional relationship of the elements N with respect to the arrangement order of the elements N.

The light control device includes an input position determination unit 31, a change position specifying unit 32, and a driving unit 33. The input position determination unit 31, the change position specifying unit 32, and the driving unit 33 are examples of a light control processing unit. The light control processing unit is not limited to those including a central processing unit and a memory, and performing all various types of processing, described later, with software. For example, the light control processing unit may include special hardware (application-specific integrated circuit: ASIC) that executes at least part of the various types of processing. That is, the light control processing unit can be configured as a circuit including 1) one or more special hardware circuits, such as ASIC, 2) one or more processors (microcomputers) that operate according to computer programs (software), or 3) a combination thereof.

The result of detection by the detection sheet 10 is supplied to the input position determination unit 31 as a detection signal SiA. Based on the detection signal SiA, the input position determination unit 31 determines whether the detection units 10A to 10H detect changes in capacitance. The input position determination unit 31 outputs the result of determination by the input position determination unit 31.

For example, when the user taps the detection unit 10A, a detection signal SiA indicating that the detection unit 10A detects changes in capacitance, and that the other detection units 10B to 10H do not detect changes in capacitance is supplied to the input position determination unit 31. The input position determination unit 31 outputs the result of determination indicating that the detection unit 10A is an input target, and that the other detection units 10B to 10H are not input targets.

The result of determination by the input position determination unit 31 is supplied to the change position specifying unit 32 as determination data DA. The change position specifying unit 32 associates each of the detection units 10A to 10H with one of the unique light control units 20A to 20H according to the arrangement of the detection units 10A to 10H. Specifically, the change position specifying unit 32 associates each of the detection units 10A to 10H with one of the unique light control units 20A to 20H from the top in the longitudinal direction according to the arrangement of the eight detection units 10A to 10H in the longitudinal direction. For example, the change position specifying unit 32 associates the detection unit 10A with the light control unit 20A, and associates the detection unit 10B with the light control unit 20B. Moreover, the change position specifying unit 32 associates the detection unit 10G with the light control unit 20G, and associates the detection unit 10H with the light control unit 20H.

Based on the determination data DA, the change position specifying unit 32 handles any of the light control units 20A to 20H associated with the input target as an output target, and specifies the output target as the output destination of a change signal SiD. Then, the change position specifying unit 32 outputs the result of specification by the change position specifying unit 32. For example, determination data DA indicating that the detection unit 10A is an input target, and that the other detection units 10B to 10H are not input targets is supplied to the change position specifying unit 32. In this case, based on the determination data DA, the change position specifying unit 32 handles the light control unit 20A associated with the detection unit 10A as an output target, and specifies the light control unit 20A as the output destination of a change signal SiD. Then, the change position specifying unit 32 outputs a specification result indicating that the light control unit 20A is the output destination of the change signal SiD.

The specification result from the change position specifying unit 32 is supplied to the driving unit 33 as specification data DB. The driving unit 33 generates a change signal SiD based on the specification data DB. The change signal SiD is a driving signal for changing the current light transmittance of each of the light control units 20A to 20H. For example, when the driving unit 33 expresses the light transmittance of each of the light control units 20A to 20H with two levels of high and low, the driving unit 33 generates a change signal SiD for reversing the current light transmittance. The driving unit 33 outputs the change signal SiD to the output target based on the specification data DB. For example, specification data DB indicating that the light control unit 20A is an output target is supplied to the driving unit 33. In this case, the driving unit 33 outputs a change signal SiD to the light control unit 20A based on the specification data DB.

Figure 3A:
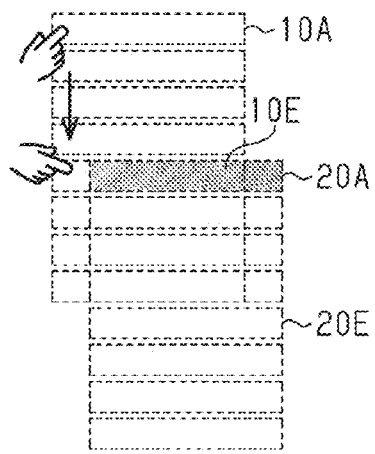
FIGS. 3(a)-3(c) are a set of diagrams each illustrating the action of the light control device.
Figure 3B:
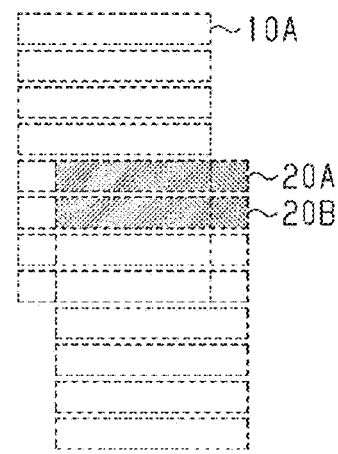
Figure 3C:
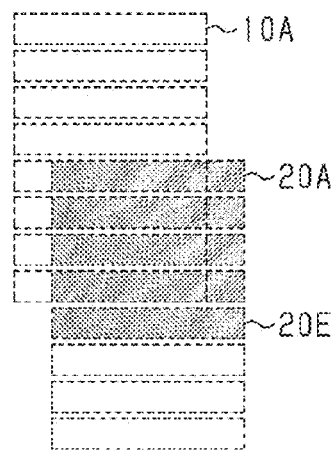
Figure 4A:
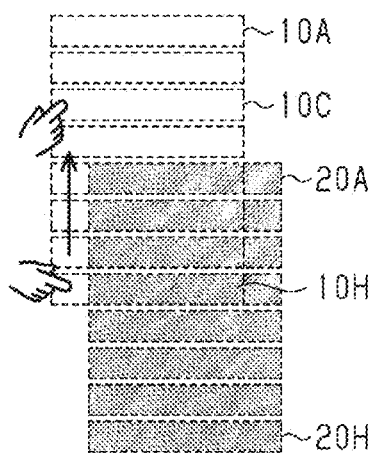
FIGS. 4(a)-4(c) are a set of diagrams each illustrating the action of the light control device.
Figure 4B:
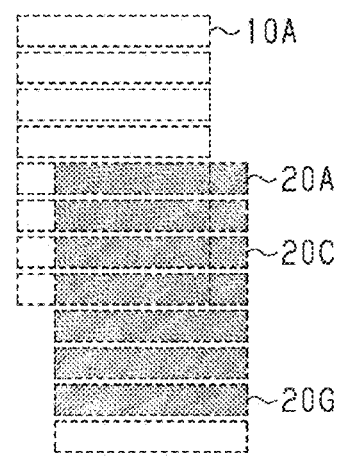
Figure 4C:
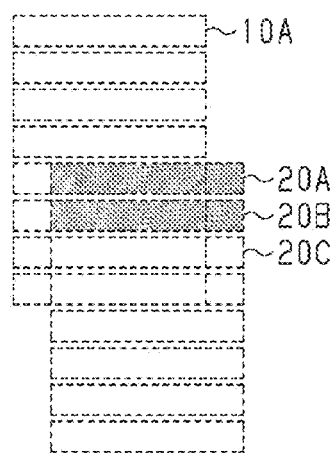

The action of the above light control device will now be described. As examples of the state of each of the light control units 20A to 20H, FIGS. 2 to 4 show a high light transmissive state as transparent, and a low light transmissive state as opaque.

Figure 2A:
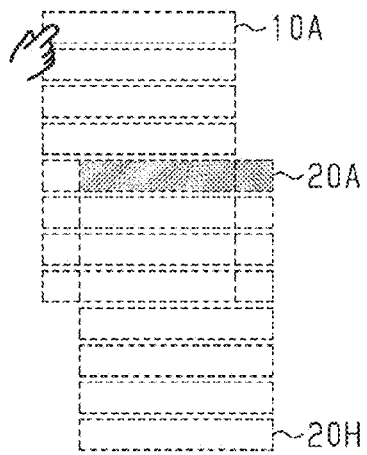
FIGS. 2(a)-2(c) are a set of diagrams each illustrating the action of the light control device.
Figure 2B:
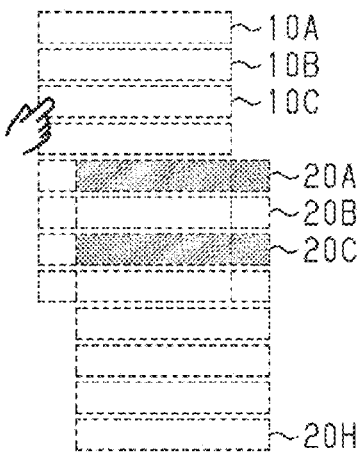
Figure 2C:
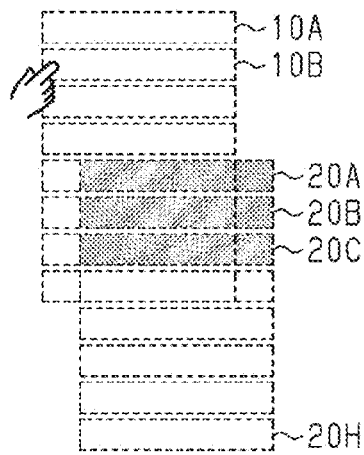

As shown in FIG. 2 (a), when the user taps the detection unit 10A in a device state in which the light control units 20A to 20H are transparent, the detection unit 10A detects changes in capacitance, and the other detection units 10B to 10H do not detect changes in capacitance. As a result, a change signal SiD is outputted to the light control unit 20A, so that the light control unit 20A changes from transparent to opaque.

As shown in FIG. 2 (b), when the user taps the detection unit 10C in a device state in which the light control units 20B to 20H are transparent, the detection unit 10C detects changes in capacitance, and the other detection units 10A, 10B, and 10D to 10H do not detect changes in capacitance. As a result, a change signal SiD is outputted to the light control unit 20C, so that the light control unit 20C changes from transparent to opaque.

As shown in FIG. 2 (c), when the user taps the detection unit 10B in a device state in which the light control units 20B and 20D to 20H are transparent, the detection unit 10B detects changes in capacitance, and the other detection units 10A and 10C to 10H do not detect changes in capacitance. Therefore, a change signal SiD is outputted to the light control unit 20B, so that the light control unit 20B changes from transparent to opaque. As a result, the light control units 20A to 20C in the upper portion of the light control sheet 20 become opaque, and the light control units 20D to 20H in the lower portion of the light control sheet 20 become transparent.

As shown in FIG. 3 (a), when the user slides a finger downward from the detection unit 10A to the detection unit 10E in a device state in which the light control units 20A to 20H are transparent, the detection units 10A to 10E sequentially detect changes in capacitance. As a result, a change signal SiD is first outputted to the light control unit 20A, so that the light control unit 20A changes from transparent to opaque. Subsequently, as shown in FIG. 3 (b) and FIG. 3 (c), the change signal SiD is outputted to the light control units 20B to 20E sequentially from the top, so that the light control units 20B to 20E change from transparent to opaque sequentially from the top. As a result, switching from transparent to opaque proceeds sequentially downward from the upper edge of the light control sheet 20. That is, a visual effect can be created such that light-blocking areas are gradually developed.

As shown in FIG. 4 (a), when the user slides a finger upward from the detection unit 10H to the detection unit 10C in a device state in which the light control units 20A to 20H are opaque, the detection units 10C to 10H detect changes in capacitance. As a result, a change signal SiD is first outputted to the light control unit 20H, so that the light control unit 20H changes from opaque to transparent. Subsequently, as shown in FIG. 4 (b) and FIG. 4 (c), the change signal SiD is outputted to the light control units 20C to 20F sequentially from the bottom, so that the light control units 20C to 20F change from opaque to transparent sequentially from the bottom. As a result, switching from opaque to transparent proceeds sequentially upward from the lower edge of the light control sheet 20. That is, a visual effect can be created such that transparent areas are gradually developed.

According to the first embodiment, the following effects are obtained.

(1) Changes in capacitance detected by the detection units 10A to 10H are converted into changes in light transmittance in the light control units 20A to 20H associated with the detection units 10A to 10H that have detected changes in capacitance. In this case, because the arrangement of the light control units 20A to 20H in the light control sheet 20 corresponds to the arrangement of the detection units 10A to 10H in the detection sheet 10, it is possible to associate the input part in the detection sheet 10 with the output part in the light control sheet 20. Accordingly, it is possible to change the light transmittance of the light control sheet 20 by intuitive operation of touching a portion in which the light transmittance is to be changed.

(2) Because the detection units 10A to 10H and the light control units 20A to 20H associated therewith overlap with each other and both have light transmissivity, it is possible to change the light transmittance of a portion in which the light transmittance is to be changed, by intuitive operation of touching the portion.

The first embodiment can also be carried out with the following modifications.

A plurality of detection units 10A to 10H can also be formed as an integrated structure. For example, the following configuration can be used. Specifically, the detection sheet 10 includes a plurality of detection elements that separately detect changes in capacitance caused by the user, and the plurality of detection elements are further divided into a plurality of detection element groups, each of which is a set of the detection elements. The detection units 10A to 10H are associated with the unique detection element groups, and the position and size of the detection units 10A to 10H are determined by data stored in the change position specifying unit 32, that is, association between the detection units 10A to 10H and the detection element groups.

In the above embodiment, a capacitance-type sheet is described as an example of the detection sheet 10. The light control device can also employ a touch sensor structure of a type other than this type as the detection sheet.

The detection sheet 10 and the light control sheet 20 can also be formed as separate parts. In this case, for example, the detection sheet 10, the input position determination unit 31, and the change position specifying unit 32 can be constituted as a single device, and configured to transmit specification data DB to the driving unit 33.

The detection sheet 10 and the light control sheet 20 can also have different sizes. For example, a detection sheet 10 smaller than a light control sheet 20 can be configured to be bonded to the light control sheet 20 so as to overlap with the light control sheet 20 in a portion suitable for operation of the light control sheet 20 in an environment in which the light control sheet 20 is placed.

Modified Example 1: Gesture

It is also possible to supply, to the input position determination unit 31, patterns derived from changes in capacitance in predetermined time intervals in the detection units 10A to 10H that have detected changes in capacitance. Moreover, it is also possible to supply, to the input position determination unit 31, patterns derived from the positional changes of the input target in the detection units 10A to 10H that have detected changes in capacitance. In this case, the input position determination unit 31 adds data relating to the input pattern to the result of determination by the input position determination unit 31.

Moreover, the storage unit provided in the change position specifying unit 32 can store each input pattern in association with a change signal SiD and the output target of the change signal SiD. The change position specifying unit 32 compares each input pattern stored in the storage unit with data relating to the pattern outputted from the input position determination unit 31, and identifies an input pattern that matches the pattern outputted from the input position determination unit 31. The change position specifying unit 32 causes the driving unit 33 to output a change signal SiD associated with the matched input pattern to the output target associated with the input pattern.

Examples of input patterns include tapping made in such a manner that a user's finger or the like instantaneously approaches any of the detection units 10A to 10H, whereby changes in capacitance are detected; long-pressing made in such a manner that a user's finger or the like is in contact with any of the detection units 10A to 10H over a predetermined period of time, whereby changes in capacitance are detected; and the like. Another input pattern is sliding made in such a manner that the position in contact with a user's finger or the like moves in a predetermined period of time in an adjacent two of the detection units 10A to 10H, whereby changes in capacitance are detected.

Other input patterns are pinch-in and pinch-out made in such a manner that the interval of two positions in simultaneous contact with user's fingers or the like in two different detection units 10A to 10H is expanded or narrowed for a predetermined period of time, whereby changes in capacitance are detected. Another input pattern is dragging made in such a manner that a user's finger or the like is brought into contact with any of the detection units 10A to 10H, and the user's finger or the like in this state is moved in a predetermined direction, whereby changes in capacitance are detected.

According to Modified Example 1 described above, the following effect is obtained.

(3) It is also possible to drive the light control device by intuitive operations, such as tapping a portion in which the light transmittance is to be changed, sliding the portion in a direction in which the light transmittance is to be changed, and long-pressing a portion in which the light transmittance is to be changed.

Modified Example 2: Light Transmittance Tone

The configuration of Modified Example 1 can be further modified in the following manner. The light transmittance of the light control units 20A to 20H is not limited to two types, that is, high light transmittance and low light transmittance, and may be three or more types, including intermediate light transmittance between high light transmittance and low light transmittance. In this case, the storage unit provided in the change position specifying unit 32 can store each input pattern in association with a change signal SiD for obtaining different types of light transmittance. The change position specifying unit 32 causes the driving unit 33 to output a change signal SiD associated with the matched input pattern to the output target, as in the above modified example.

Figure 5A:
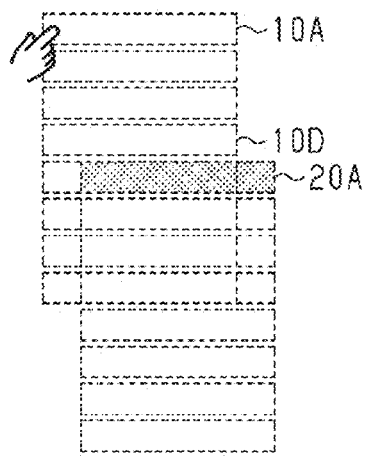
FIGS. 5(a)-5(c) are a set of diagrams each illustrating the action of a light control device of a modified example.
Figure 5B:
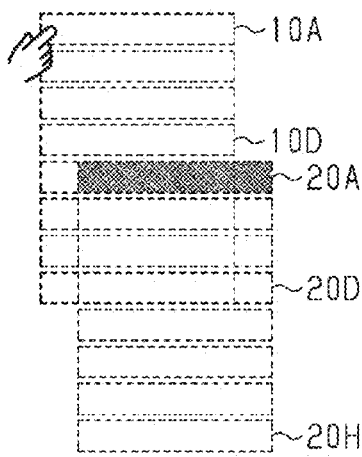
Figure 5C:
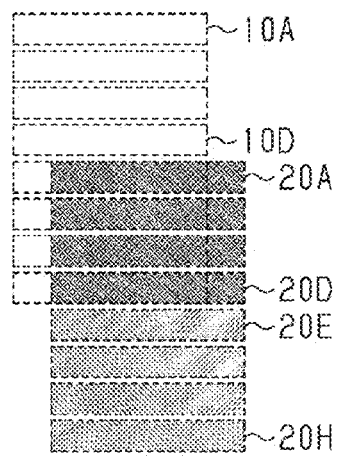

With reference to FIGS. 5 (a) to 5(c), an example of the action of the light control device of the above modified example will be described. In the description with reference to FIGS. 5 (a) to 5(c), regarding the light transmittance of the light control units 20A to 20H, high light transmittance is shown as transparent (non-dotted area in FIGS. 5(a) to 5(c)), and low light transmittance is shown as opaque (thick-dotted area in FIGS. 5(a) to 5(c)). Furthermore, intermediate light transmittance between high light transmittance and low light transmittance is shown as translucent (thin-dotted area in FIGS. 5(a) to 5(c)). The storage unit of the change position specifying unit 32 stores two input patterns, that is, tapping and long-pressing.

The change position specifying unit 32 associates an input pattern corresponding to tapping with, as the output target, the light control units 20A to 20H facing the detection units 10A to 10H that have detected tapping. The change position specifying unit 32 associates the input pattern corresponding to tapping with, as a change signal SiD, a signal for switching the current light transmittance to the next state in the order of transparent, translucent, and opaque.

The change position specifying unit 32 associates an input pattern corresponding to long-pressing with, as the output target, the light control units 20A to 20H facing the detection units 10A to 10H that have detected long-pressing. The change position specifying unit 32 associates the input pattern corresponding to long-pressing with, as a change signal SiD, a signal for making the current light transmittance closer to opaque as the long-push duration increases.

As shown in FIGS. 5 (*a*) and 5 (*b*), when the detection unit 10A is long-pressed while the light control units 20A to 20H are transparent, the state of the light control unit 20A changes in the order of transparent, translucent, and opaque. Then, as shown in FIG. 5 (*c*), when the detection units 10B to 10D are long-pressed, and when the detection units 10E to 10H are tapped, the light control units 20B to 20D change from transparent to opaque, and the light control units 20E to 20H change from transparent to translucent.

According to Modified Example 2, the following effects are obtained.

(4) It is possible to promote understanding by the user that the light transmittance of the light control units 20A to 20H changes in three stages, and that the light transmittance of the light control units 20A to 20H decreases more as the long-push duration increases.

(5) It is also possible to continuously change the light transmittance of the light control units 20A to 20H by intuitive operation of long-pushing a portion in which the light transmittance is to be changed.

It is also possible to associate the input pattern corresponding to long-pressing with, as a change signal SiD, a signal for making the current light transmittance closer to transparent as the long-push duration increases. That is, each change signal SiD associated with a corresponding input pattern may produce different changes in light transmittance in the output target.

Modified Example 3: Corresponding Relationship

Figure 6:
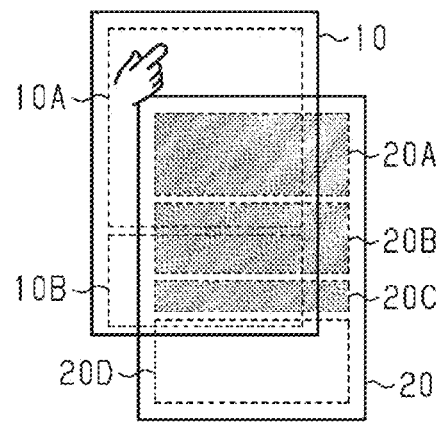
FIG. 6 illustrates the arrangement of light control units in the light control device of a modified example.

As shown in FIG. 6, two or more of the light control units 20A, 20B, and 20C can be associated with the single detection unit 10A. In such a light control device, the detection units 10A and 10B are arranged in the vertical direction, the light control units 20A to 20D are arranged in the vertical direction, and the detection unit 10A positioned at the top is associated with the light control unit 20A positioned at the top, and the light control units 20B and 20C positioned below the light control unit 20A. The detection unit 10B positioned at the bottom is associated with the light control unit 20D positioned at the bottom. In this correspondence relationship, the regularity of the arrangement of the detection units 10A and 10B is the same as the regularity of the arrangement of the light control units 20A to 20D.

Figure 7:
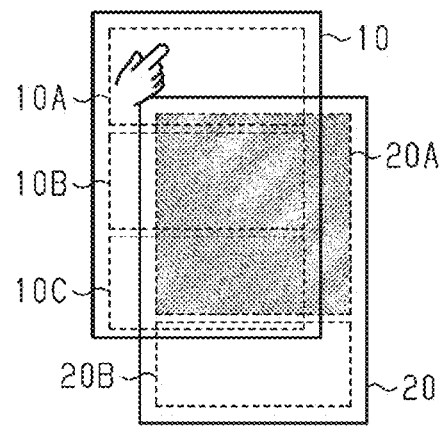
FIG. 7 illustrates the arrangement of detection units in the light control device of the modified example.

As shown in FIG. 7, the single light control unit 20A can be associated with two or more of the detection units 10A and 10B. In such a light control device, the detection units 10A to 10C are arranged in the vertical direction, the light control units 20A and 20B are arranged in the vertical direction, and the detection unit 10A positioned at the top is associated with the light control unit 20A positioned at the top. Moreover, the detection unit 10B positioned below the detection unit 10A is also associated with the light control unit 20A. The detection unit 10C positioned at the bottom is associated with the light control unit 20B positioned at the bottom. In this correspondence relationship, the regularity of the arrangement of the three detection units 10A to 10C is the same as the regularity of the arrangement of the two light control units 20A and 20B.

From the viewpoint that the light transmittance of the light control sheet can be changed by intuitive operation of touching the light control device, the light control device can also be configured to include a single light control unit and a single detection unit. With this configuration, it is possible to derive a technical idea described in the following additional notes.

Additional Notes

The light control device includes a light control sheet including a light control unit configured to change light transmittance, and a detection sheet including a detection unit that is associated with the light control unit and that is configured to detect changes in capacitance. Furthermore, the light control device includes a driving unit that outputs a change signal for changing light transmittance to the light control unit, and a light control processing unit that causes the driving unit to output the change signal to an output target, where the output target is the light control unit associated with an input target, and the input target is the detection unit that has detected changes in capacitance.

Figure 8:
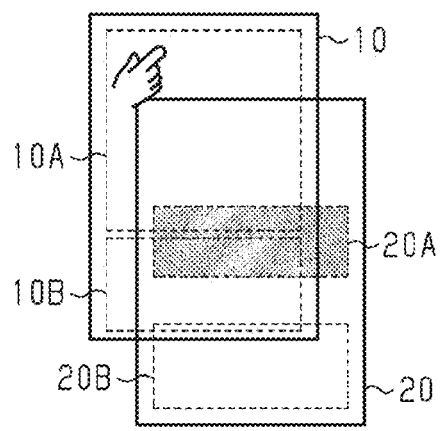
FIG. 8 illustrates the size of the light control units in the light control device of the modified example.

As shown in FIG. 8, the size of a detection unit 10A and the size of a light control unit 20A, which faces the detection unit 10A, can be different from each other.

As described above with reference to FIGS. 6 to 8, it is only necessary for the light control device to have a configuration in which detection units have an arrangement compatible with the arrangement of light control units, and each detection unit is associated with the unique light control unit according to each arrangement.

Figure 9:
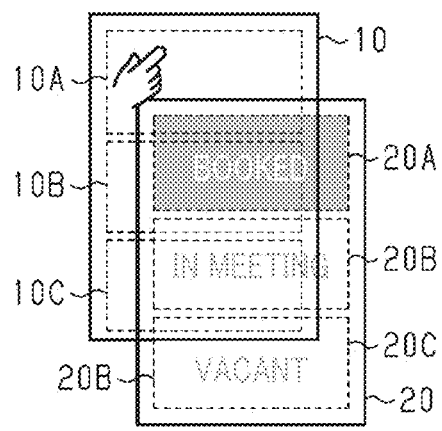
FIG. 9 illustrates the form of the light control units in the light control device of the modified example.

As shown in FIG. 9, the shape bordered by single light control units 20A to 20C can display the status of the environment of the facility etc. in which the light control device is placed. In this case, it is also possible to match the arrangement direction of the light control units 20A to 20C with the shift direction of the contents displayed by the light control units 20A to 20C. For example, when the light control device is placed in a window or the like in an office meeting room, the light control units 20A to 20C are arranged from top to bottom, and the contents displayed when the light control units 20A to 20C are opaque can be shown as "booked," "in meeting," and "vacant," sequentially from the top. Furthermore, when the light control units 20A to 20C are opaque, the light control units 20A to 20C each can show a unique color. For example, the light control unit 20A may show white when it is opaque, and the light control units 20B and 20C may show black when they are opaque.

Modified Example 4: Wiring Width

Figure 10:
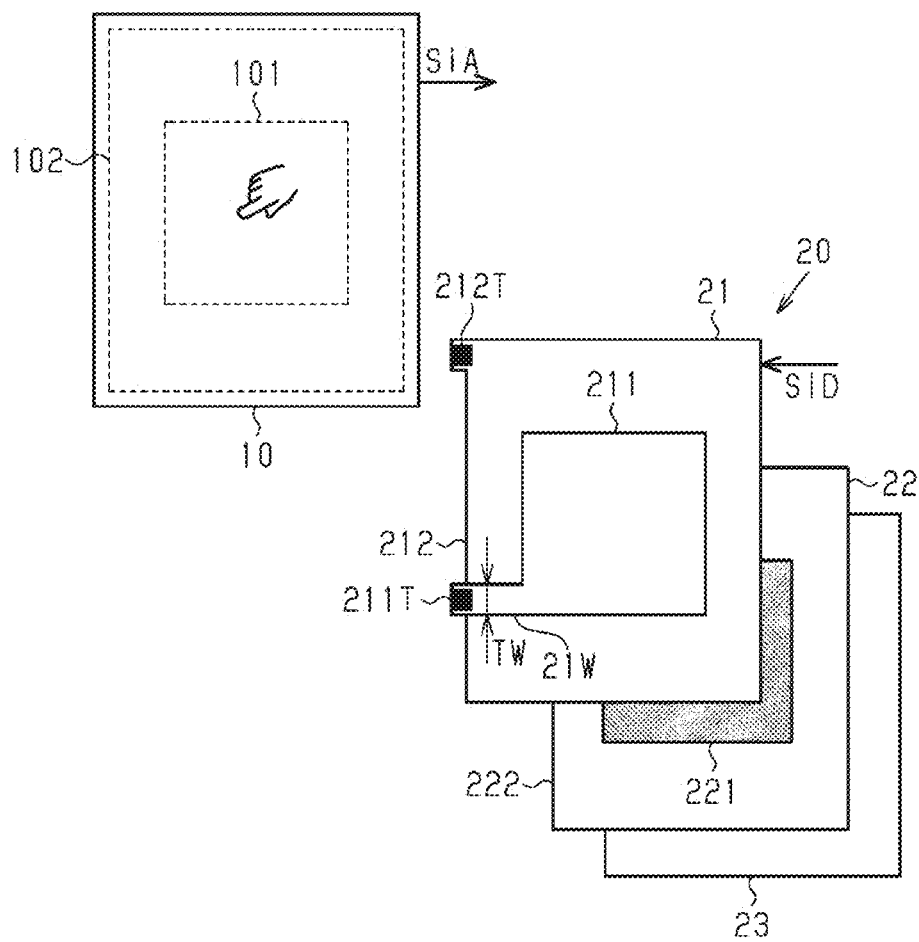
FIG. 10 is an exploded view illustrating a layer structure in the light control device of a modified example, and also illustrating the size of a wiring layer provided in a light control sheet.

As shown in FIG. 10, the detection sheet 10 includes a first detection unit 101 positioned substantially in the center of the detection sheet 10, and a second detection unit 102 in an annular shape surrounding the first detection unit 101. The light control sheet 20 includes a first electrode layer 21 having light transmissivity, and a second electrode layer 23 having light transmissivity. The light control sheet 20 further includes a liquid crystal-type light control layer 22 containing a liquid crystal composition and sandwiched between the first electrode layer 21 and the second electrode layer 23.

The light control layer 22 includes a first light control element 221 positioned substantially in the center of the light control layer 22, and a second light control element 222 in an annular shape surrounding the first light control element 221. The arrangement of the first light control element 221 and the second light control element 222 corresponds to the arrangement of the light control units.

The first electrode layer 21 is an example of the input target layer into which a voltage signal is inputted, and includes two electrode elements, that is, a central electrode element 211 and a peripheral electrode element 212, which have an arrangement with the same regularity as the regularity of the arrangement of the light control units. The arrangement of the two electrode elements is an example of the fourth arrangement. The central electrode element 211 faces the first light control element 221 and the first detection unit 101. The peripheral electrode element 212 faces the second light control element 222 and the second detection unit 102.

The first electrode layer 21 includes two terminal parts 211T and 212T positioned at the edge of the first electrode layer 21. The first electrode layer 21 further includes a wiring layer 21W connected to the terminal part 211T and the central electrode element 211. The direction orthogonal to the extending direction of the wiring layer 21W is a width direction, and the width TW of the wiring layer 21W in the width direction is sufficiently smaller than the width of the central electrode element 211 connected to the wiring layer 21W.

Here, it is assumed that the change signal SiD is a voltage signal at a level that is sufficient to change the orientation of the liquid crystal composition even in the portion facing the wiring layer 21W. In this case, when light transmittance changes in the light control unit including the central electrode element 211, light transmittance also changes in the portion including the wiring layer 21W However, many users do not intend that in the light control device, light transmittance changes as described above in the portion facing the wiring layer 21W.

In this case, as described above, the wiring layer 21W preferably has a width TW that does not change the orientation of the liquid crystal composition in the portion facing the wiring layer 21W, even if the change signal SiD is applied thereto. In other words, the voltage level of the change signal SiD is preferably suppressed to a level that does not change the orientation of the liquid crystal composition in the portion facing the wiring layer 21W. The width TW of the wiring layer 21W is 1 mm or less, for example. In the configuration in which the liquid crystal composition is positioned between the first electrode layer 21 and the second electrode layer 23, the voltage of the central electrode element 211 can be easily increased, and excess electric current is not supplied to the wiring layer 21W. Accordingly, the wiring layer 21W may have a width TW that allows application of voltage sufficient to change the orientation of the liquid crystal composition to the central electrode element 211. In order to prevent the electric field produced by the wiring layer 21W mentioned above, the second electrode layer 23 preferably has voids, such as slits, in the portion facing the wiring layer 21W.

According to Modified Example 4, the following effects are obtained.

(6) The wiring layer 21W for applying voltage to the central electrode element 211 is required to have various shapes and positions, based on the relative relationship between the position of the central electrode element 211 and the position of the driving unit 33. In this respect, according to the light control device of Modified Example 4, the light transmittance of the portion of the light control sheet 20 facing the central electrode element 211 is changed, while the change in the light transmittance of the portion of the light control sheet 20 facing the wiring layer 21W is prevented. Therefore, it is possible to prevent changes in light transmittance only in the position facing the wiring layer 21W, that is, changes in light transmittance in portions irrelevant to the intuitive operation.

(7) Because it is possible to change light transmittance only in the annularly surrounded area, the usefulness of the effect stated in the above (6) can be further enhanced. Moreover, the processing of increasing light transmittance sequentially from the first light control element 221 to the second light control element 222 is associated with the input patterns of pinch-in and pinch-out. Alternatively, the processing of reducing light transmittance sequentially from the first light control element 221 to the second light control element 222 is associated with the input patterns of pinch-in and pinch-out. This enables more intuitive operation.

Second Embodiment

An embodiment that embodies the light control sheet 20 of the first embodiment as a light control sheet including a PNLC-type light control layer, and that embodies the detection sheet 10 of the first embodiment as a projection capacitance-type detection sheet is described as a second embodiment.

Figure 11:
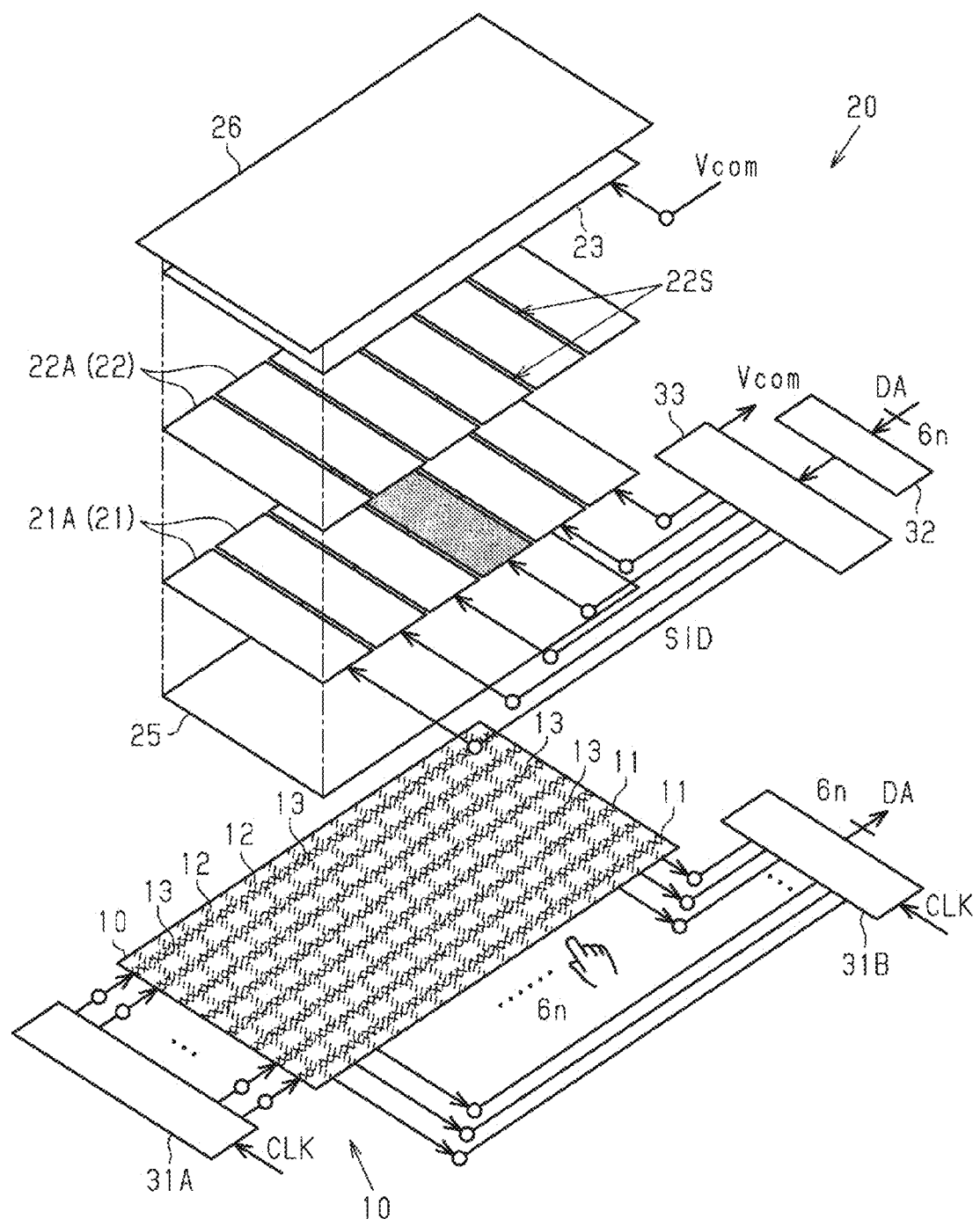
FIG. 11 is an exploded perspective view illustrating the configuration of a light control device in a second embodiment.

As shown in FIG. 11, the light control device includes a detection sheet 10 and a light control sheet 20. The detection sheet 10 includes a plurality of drive electrodes 11 extending in one extending direction, and a plurality of sensing electrodes 12 extending in the direction orthogonal to the extending direction of the drive electrodes 11. Each drive electrode 11 and each sensing electrode 12 are spaced from each other in the superposition direction of the detection sheet 10 and the light control sheet 20. A dielectric layer (not shown) is positioned between the drive electrodes 11 and the sensing electrodes 12 in order to form predetermined capacitance between the drive electrodes 11 and the sensing electrodes 12. When viewed in the superposition direction of the detection sheet 10 and the light control sheet 20, the intersections of the drive electrodes 11 and the sensing electrodes 12 in the detection sheet 10 are detection elements 13. The detection sheet 10 includes a large number of detection elements 13 positioned in a matrix form.

The drive electrodes 11 are connected in parallel with a scanning unit 31A. The scanning unit 31A synchronizes application of voltage for detecting changes in capacitance with a clock signal CLK in the sorting order of the plurality of drive electrodes 11, and scans the plurality of drive electrodes 11 one by one. The sensing electrodes 12 are connected in parallel with a current detection unit 31B. The current detection unit 31B detects changes in electric current flowing through each sensing electrode 12, in synchronization with the clock signal CLK. The current detection unit 31B generates data indicating the position of the detection element 13 that has detected changes in capacitance, based on the position of the sensing electrode 12 in which changes in electric current have been detected, and the position of the drive electrode 11 to which voltage has been applied when the electric current is detected. The scanning unit 31A and the current detection unit 31B constitute an input position determination unit 31, and output the result of detection by the current detection unit 31B as determination data DA.

The light control sheet 20 includes a first electrode layer 21 having light transmissivity, a second electrode layer 23 having light transmissivity, and a light control layer 22 sandwiched between the first electrode layer 21 and the second electrode layer 23. Furthermore, the light control sheet 20 includes a barrier layer 26 covering the first electrode layer 21, the light control layer 22, and the second electrode layer 23.

The first electrode layer 21 is constituted from a plurality of first electrode elements 21A arranged in the extending direction of the drive electrodes 11. A change signal SiD, which is a voltage signal, is applied to each of the first electrode elements 21A from a driving unit 33. The second electrode layer 23 is a single conductive film facing all of the first electrode elements 21A. Reference voltage Vcom is applied to the second electrode layer 23 from the driving unit 33. Examples of the materials that constitute the first electrode layer 21 and the second electrode layer 23 include tin-doped indium oxide (ITO), tin oxide (TO), and fluorine-doped tin oxide (FTO). The second electrode layer 23 can also be constituted from a plurality of electrode elements, as with the first electrode layer 21.

The light control layer 22 is constituted from a plurality of light control elements 22A facing the first electrode elements 21A. Each light control element 22A includes a polymer network-type liquid crystal having a PNLC (polymer network liquid crystal) structure. The liquid crystal molecules contained in each light control element 22A are, for example, such that the dielectric anisotropy is positive, and such that the dielectric constant of the liquid crystal molecules in the major axis direction is larger than the dielectric constant of the liquid crystal molecules in the minor axis direction. Examples of liquid crystal molecules include those based on Schiff bases, azo types, azoxy types, biphenyls, terphenyls, benzoic acid esters, tolan types, pyrimidines, cyclohexanecarboxylic acid esters, phenylcyclohexanes, and dioxanes. A sealant 22S with gas barrier function is embedded in the gaps between the adjacent first electrode elements 21A and in the gaps between the adjacent light control elements 22A. The sealant 22S filling these gaps has sufficient insulation resistance to the voltage applied between the adjacent first electrode elements 21A.

The barrier layer 26 has at least one of gas barrier function and UV barrier function. The gas barrier function is a function to suppress contact between the liquid crystal composition contained in the light control layer 22 and atmospheric air. The UV barrier function is a function to suppress entry of ultraviolet rays into the liquid crystal composition contained in the light control layer 22. The barrier layer 26 with gas barrier function is configured, for example, as a laminate of a plastic film and a gas barrier film. The plastic film is a polyester film, a polycarbonate film, a polyarylate film, or a polyether sulfone film. The gas barrier film is, for example, a silicon oxide film or a silicon oxynitride film. The barrier layer 26 with UV barrier function contains, for example, a photoinitiator, a compound having an unsaturated double bond, and a triazine-based ultraviolet absorber. Examples of ultraviolet absorbers include salicylic acid-based ultraviolet absorbers, b enzophenone-based ultraviolet absorbers, benzotriazole-based ultraviolet absorbers, cyanoacrylate-based ultraviolet absorbers, and triazine-based ultraviolet absorbers.

The liquid crystal composition contained in the PNLC-type light control layer contains an ionizing radiation curable resin, which is a photopolymerizable compound. Since the phenyl groups of the ionizing radiation curable resin, unreacted polymerizable unsaturated bonds, and the photoinitiator are easily modified upon absorption of ultraviolet rays in outdoor daylight, the liquid crystal composition is likely to be deteriorated by ultraviolet radiation. In contrast, when the liquid crystal composition contains weather-proofing agents, such as an ultraviolet absorber and a light stabilizer, in order to suppress the deterioration of the liquid crystal composition, the weather-proofing agents absorb ultraviolet rays, which are required for curing, during curing and molding of the light control layer 22, and curing reaction is inhibited. Accordingly, with the configuration in which not the liquid crystal composition, but members other than the light control layer 22 have the function of preventing the entry of ultraviolet rays, as described above, it is possible to protect the light control layer 22 from ultraviolet rays, and it is also possible to improve the weather resistance of the light control sheet 20.

A light-transmissive substrate 25 is positioned between the detection sheet 10 and the light control sheet 20. The light-transmissive substrate 25 is an insulator for suppressing noise arising from the first electrode layer 21 against the detection sheet 10. The light-transmissive substrate 25 has support surfaces that face each other. One support surface of the light-transmissive substrate 25 supports the detection sheet 10, and the other support surface of the light-transmissive substrate 25 supports the light control sheet 20. The light-transmissive substrate 25 has a thickness of 0.5 mm or more, for example. Examples of the material that constitutes the light-transmissive substrate 25 include transparent inorganic materials, such as glass and silicone; and transparent organic materials, such as polymethacrylic acid ester resin, polyethylene, polystyrene, polyethylene terephthalate, polyvinyl alcohol, polycarbonate, polyvinyl chloride, polyimide, and polysulfone.

Because the first electrode layer 21 provided in the light control sheet 20, and the detection elements 13 provided in the detection sheet 10 face each other, the first electrode layer 21, which is a conductor, easily transmits external electrical noise received thereby to each detection element 13 facing the first electrode layer 21. In this respect, when the light-transmissive substrate 25 positioned between the detection elements 13 and the light control sheet 20 is an insulator having a thickness of 0.5 mm or more, each detection element 13 is less likely to detect electrical noise in the first electrode layer 21. In particular, when the material that constitutes the light-transmissive substrate 25 is glass with a relative dielectric constant of 7.0 or more and 8.0 or less, or a polymethacrylic acid ester resin with a relative dielectric constant of about 3.3, if the light-transmissive substrate 25 has a thickness of 0.5 mm or more, transmittance of signal changes in the first electrode layer 21 to each detection element 13 can be well suppressed. As a result, in a configuration in which the detection sheet 10 and the light control sheet 20 face each other to further facilitate intuitive operation, desired accuracy can also be obtained for the results detected by the detection elements 13.

It is also possible that the light-transmissive substrate 25 has at least one of a gas barrier function and UV barrier function, as with the barrier layer 26 mentioned above. Bonding between the light-transmissive substrate 25 and the detection sheet 10, and bonding between the light-transmissive substrate 25 and the light control sheet 20 can be achieved by using a transparent pressure-sensitive adhesive, such as an optical double-sided pressure-sensitive adhesive sheet (OCA). Alternatively, the frame part of each sheet can be bonded together using an adhesive tape or the like. Furthermore, the light-transmissive substrate 25 can be a substrate supporting the first electrode layer 21, and can also serve as part of the light control sheet 20. Moreover, the light-transmissive substrate 25 can be a substrate supporting the sensing electrodes 12 or the drive electrodes 11, and can also serve as part of the detection sheet 10.

Figure 12:
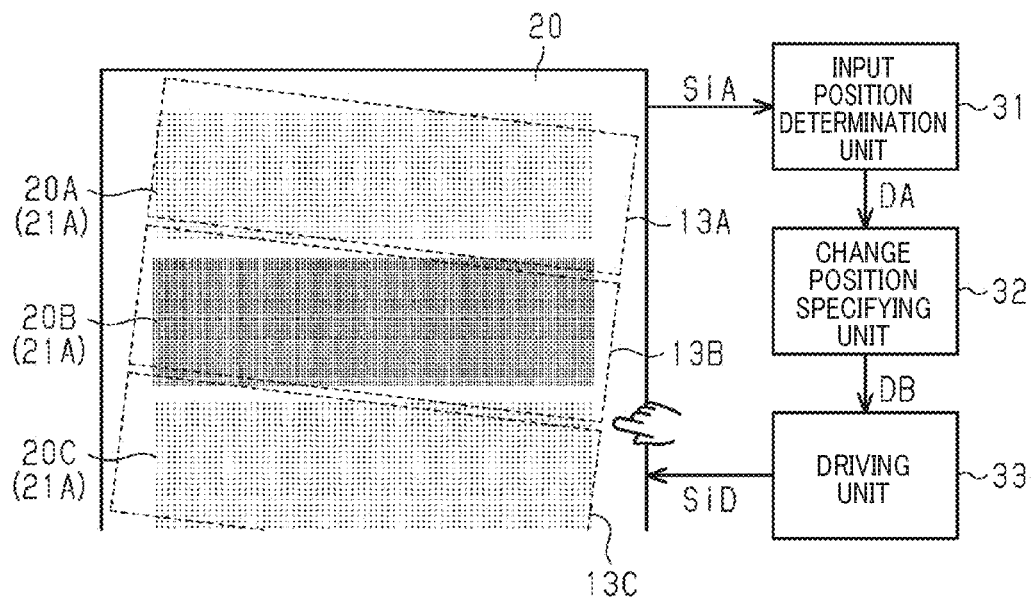
FIG. 12 is an enlarged view illustrating deviation between the arrangement of light control units and the arrangement of detection units in the light control device.

As shown in FIG. 12, light control units 20A, 20B, and 20C provided in the light control sheet 20 are regions facing the first electrode elements 21A, and each include one first electrode element 21A. Detection element groups 13A, 13B, and 13C provided in the detection sheet 10 are each a set of a plurality of adjacent detection elements 13, and the detection elements 13 belonging thereto can be changed. The detection element groups 13A, 13B, and 13C each function as a detection unit.

The storage unit of the change position specifying unit 32 stores data that associates the detection element groups 13A, 13B, and 13C respectively with the light control units 20A, 20B, and 20C to face them. The storage unit of the change position specifying unit 32 stores conversion data 32A (see FIG. 13) that associates each detection element 13 with the detection element groups 13A, 13B, and 13C to which it belongs.

When the detection sheet 10 and the light control sheet 20 are superposed, the arrangement direction of the detection element groups 13A, 13B, and 13C in the detection sheet 10 may be deviated from the arrangement direction of the light control units 20A, 20B, and 20C in the light control sheet 20. In this case, the regions facing the light control units 20A, 20B, and 20C are deviated from the detection element groups 13A, 13B, and 13C. For example, as shown in FIG. 12, when the user taps the upper right corner of the light control unit 20C, the change position specifying unit 32 recognizes that changes in capacitance are detected in the lower right corner of the detection element group 13B. As a result, the change position specifying unit 32 causes the driving unit 33 to output a change signal SiD for changing the light transmittance of the light control unit 20B, so that the light transmittance of the light control unit 20B changes.

Accordingly, the change position specifying unit 32 performs creation processing to create the above conversion data 32A for storage in the change position specifying unit 32. Then, the change position specifying unit 32 performs general processing to identify the detection element groups 13A, 13B, and 13C to which the detection elements 13 belong, based on the conversion data 32A in the processing of associating each of the detection element groups 13A, 13B, and 13C with any of the light control units 20A, 20B, and 20C.

Figure 13:
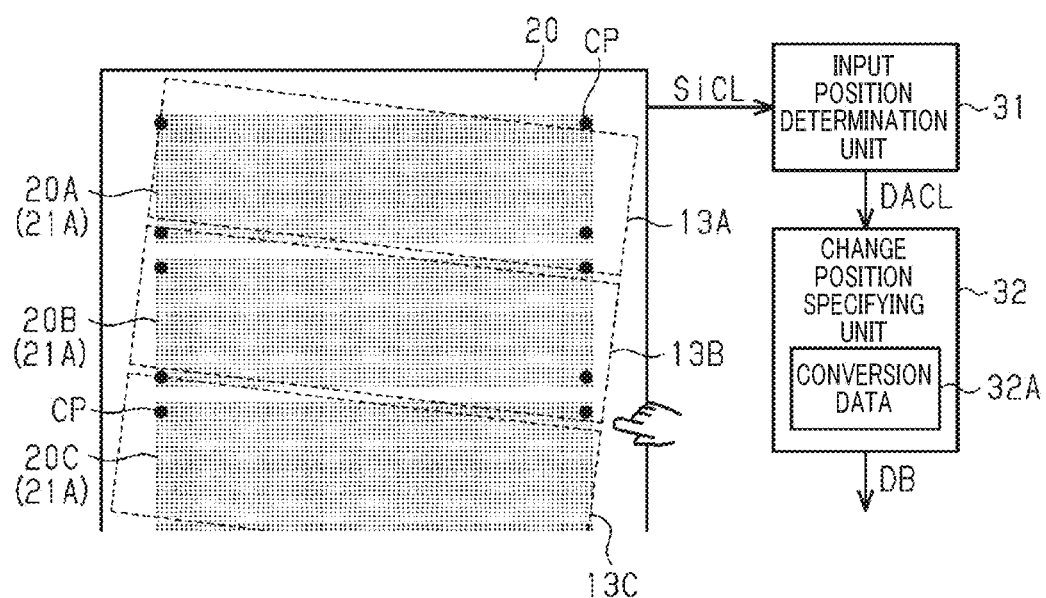
FIG. 13 is an enlarged view illustrating the position of calibration in creation processing performed by the light control device.

As shown in FIG. 13, in the creation processing performed by the change position specifying unit 32, the light control unit 20A is first driven into a visible state. Subsequently, the user taps the four corners of the light control unit 20A previously set as calibration points CP of the light control unit 20A, according to a predetermined order. In this case, the result of detection by the detection sheet 10 is supplied to the input position determination unit 31 as a calibration detection signal SiCL. Based on the calibration detection signal SiCL, the input position determination unit 31 outputs data relating to four detection elements 13 that have detected changes in capacitance, as calibration data DACL, to the change position specifying unit 32. Then, based on the calibration data DACL, the change position specifying unit 32 associates a set of the detection elements 13 surrounded by the four detection elements 13 with the detection element group 13A.

After that, the change position specifying unit 32 performs the above creation processing on the other light control units 20B and 20C to thereby associate a set of the detection elements 13 facing the light control units 20A, 20B, and 20C with the detection element groups 13A, 13B, and 13C. When this creation processing is completed, the change position specifying unit 32 performs the general processing. Specifically, the change position specifying unit 32 identifies the detection element groups 13A, 13B, and 13C to which the detection elements 13 that have detected changes in capacitance belong, based on the conversion data 32A created by the above creation processing, and specifies, as output targets, the light control units 20A, 20B, and 20C associated with the identified detection element groups 13A, 13B, and 13C.

According to the second embodiment, the following effects are obtained.

(8) Because the light-transmissive substrate 25 positioned between the detection sheet 10 and the light control sheet 20 has thickness required for insulation to prevent noise contamination in the detection results, it is possible to increase the accuracy of detecting changes in capacitance. Furthermore, because superposition of the detection sheet 10 and the light control sheet 20 is facilitated, it is easy to prevent expansion of the area occupied by the light control device.

(9) If the rigidity of the detection sheet 10 and the rigidity of the light control sheet 20 are less than the rigidity required for the light control device, the light-transmissive substrate 25 for increasing detection accuracy also functions to increase the rigidity.

(10) In the configuration in which the detection sheet 10 and the light control sheet 20 are superposed, even if deviation occurs in the relative positions of the previously set detection units and the light control units to face the detection units, the deviation can be corrected by creation processing performed by the change position specifying unit 32.

The second embodiment can also be carried out with the following modifications.

The gas barrier function and UV barrier function of the barrier layer 26 can also be imparted to an adhesive layer for bonding the light-transmissive substrate 25 and the light control sheet 20, and an adhesive layer for bonding the light-transmissive substrate 25 and the detection sheet 10. That is, component members other than the laminate including the first electrode layer 21, the light control layer 22, and the second electrode layer 23 can have the gas barrier function and the UV barrier function.

The second embodiment and modified examples thereof can also be carried out in combination with the first embodiment and the modified examples thereof where appropriate.

In the second embodiment, the second electrode layer 23 is described as being a single conductive film. In the light control device, it is also possible to divide the second electrode layer 23 into a plurality of regions. It is desirable that the second electrode layer 23 is divided into regions in positions corresponding to the dividing positions of the first electrode layer 21 and the light control layer 22, although it is not limited thereto. The configuration in which the second electrode layer 23 is divided into regions is advantageous in that stable reference voltage Vcom is also applied at the terminal (the portion most distant from the portion connected with the electrode wire) as a common electrode. In the above embodiment, as the second electrode layer 23 is larger, there is a higher risk that voltage drop to the above terminal may occur significantly. Accordingly, in order to apply constant reference voltage Vcom to the above terminal, it is considered to be necessary to apply drive voltage equal to or more than Vcom from the driving unit 33. In this respect, with the configuration in which the second electrode layer 23 is divided into regions, the distance from the portion connected to the electrode wire in each region to the terminal can be shortened. As a result, the configuration in which the second electrode layer 23 is divided into regions is also advantageous in that drive voltage applied can be kept low.

Modified Example 5

Figure 14:
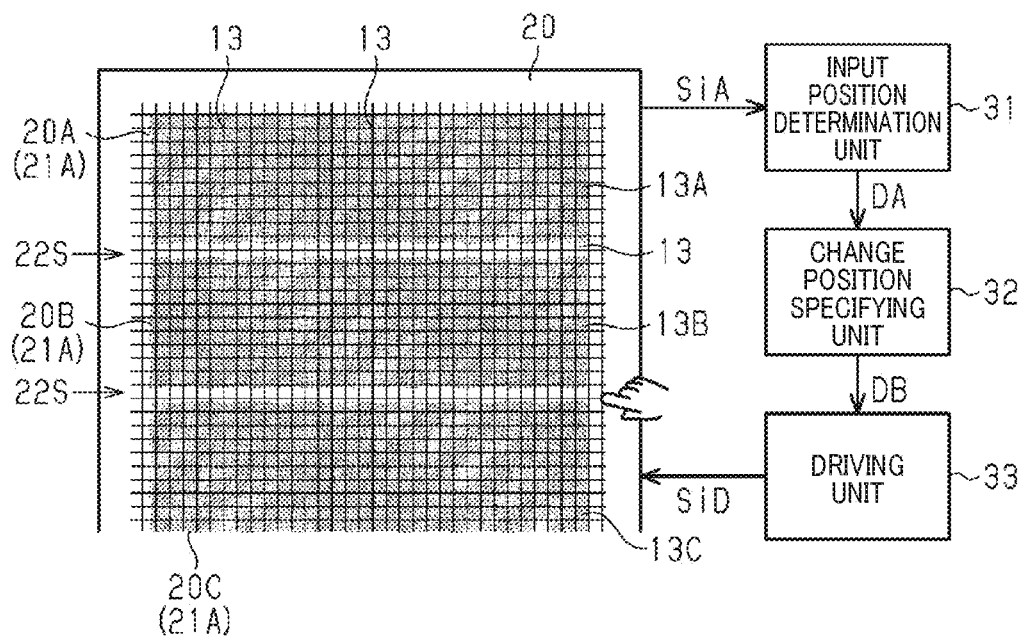
FIG. 14 illustrates detection elements positioned between detection element groups in the light control device.

As shown in FIG. 14, it is also possible that the detection sheet 10 may not associate at least one of the detection elements 13 positioned between the adjacent detection element groups 13A and 13B with the detection element groups 13A and 13B. In other words, it is possible that the change position specifying unit 32 may not associate at least one of the detection elements 13 positioned between the adjacent detection element groups 13A and 13B with any of the detection element groups 13A, 13B, and 13C in the conversion data 32A for associating each detection element 13 with any of the detection element groups 13A, 13B, and 13C. The arrangement of the detection element groups 13A, 13B, and 13C is an example of the third arrangement.

For example, in FIG. 14, the gap between the adjacent detection element groups 13A and 13B faces the gap between the adjacent light control units 20A and 20B. Thus, a line of detection elements 13 is arranged along the extending direction of the detection element groups 13A and 13B in the gap between the adjacent detection element groups 13A and 13B. These detection elements 13 arranged in a line are not associated with any of the detection element groups 13A, 13B, and 13C in the conversion data 32A stored in the change position specifying unit 32.

Moreover, the gap between the adjacent detection element groups 13B and 13C faces the gap between the adjacent light control units 20B and 20C. Thus, a line of detection elements 13 is arranged along the extending direction of the detection element groups 13B and 13C in the gap between the adjacent detection element groups 13B and 13C. These detection elements 13 arranged in a line are also not associated with any of the detection element groups 13A, 13B, and 13C in the conversion data 32A stored in the change position specifying unit 32.

According to Modified Example 5 described above, the following effects are obtained.

(11) Because the detection element groups 13A, 13B, and 13C constituted from a plurality of detection elements 13 each function as a single detection unit, it is possible to increase the positional resolution for detecting changes in capacitance.

(12) Detection elements 13 that do not belong to any of the detection element groups 13A, 13B, and 13C are positioned between the adjacent detection element groups 13A, 13B, and 13C. Changes in capacitance in areas between the adjacent detection element groups 13A, 13B, and 13C are excluded from detection by the detection element groups 13A, 13B, and 13C. Therefore, it is possible to suppress erroneous detection in areas between the adjacent detection element groups 13A, 13B, and 13C.

Modified Example 6

It is also possible to supply, to the input position determination unit 31, a pattern derived from changes at predetermined time for each detection element 13 that has detected changes in capacitance. Furthermore, it is also possible to supply, to the input position determination unit 31, a pattern derived from the positional change of the detection element 13 that has detected changes in capacitance among the detection elements 13 that have detected changes in capacitance. In this case, the input position determination unit 31 adds data relating to the input pattern to the result of determination by the input position determination unit 31.

Figure 15:
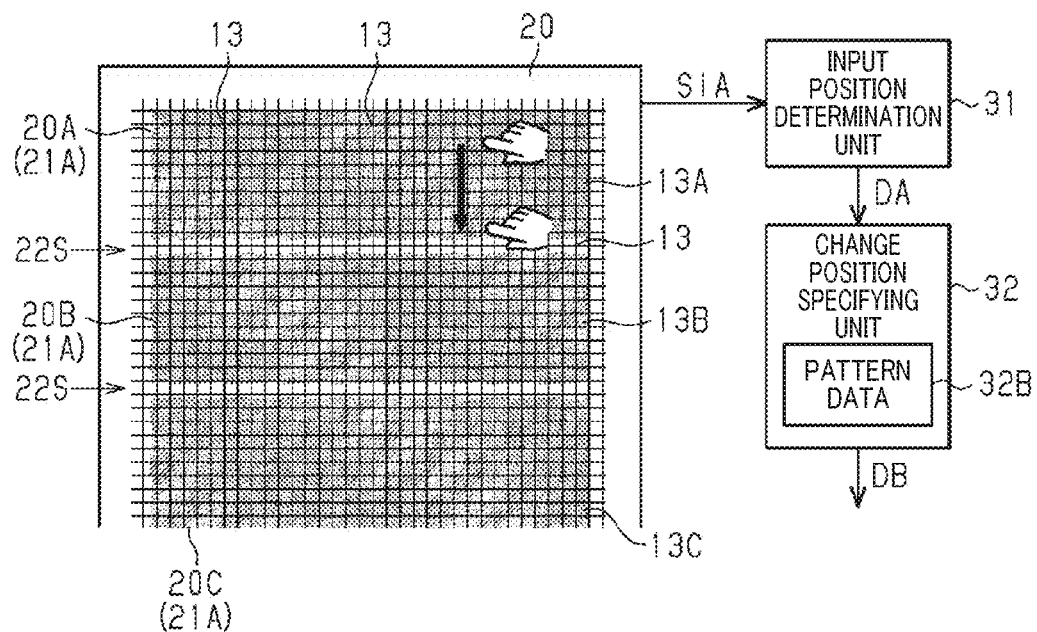
FIG. 15 illustrates the action of the light control device when sliding is inputted as a gesture.

Moreover, as shown in FIG. 15, the storage unit provided in the change position specifying unit 32 can store pattern data 32B that associates each input pattern with a change signal SiD and a second output target, which receives the change signal SiD. The second output targets are two or more of the light control units 20A, 20B, and 20C. The change position specifying unit 32 compares each input pattern stored in the storage unit with the pattern outputted from the input position determination unit 31, and identifies the input pattern that matches the pattern outputted from the input position determination unit 31. Moreover, the change position specifying unit 32 causes the driving unit 33 to output a change signal SiD associated with the matched input pattern to the second output target associated with the input pattern.

For example, the input pattern is a pattern corresponding to sliding, and is detected in such a manner that the position in contact with a user's finger or the like moves for a predetermined period of time in the single detection element groups 13A, 13B, and 13C. The input pattern corresponding to sliding is associated with a signal for making the state of the light control units 20A, 20B, and 20C opaque, as a change signal SiD. Furthermore, the input pattern corresponding to sliding is associated with the light control units 20A, 20B, and 20C as second output targets.

When an operation corresponding to sliding is performed, the change position specifying unit 32 compares each input pattern stored in the storage unit with the pattern outputted from the input position determination unit 31, and identifies the input pattern that matches the pattern outputted from the input position determination unit 31 as corresponding to sliding. Subsequently, the change position specifying unit 32 causes the driving unit 33 to output the change signal SiD associated with the matched input pattern to the second output target associated with the input pattern. Specifically, the change signal SiD for making the state of the light control units 20A, 20B, and 20C opaque is sequentially outputted to the light control units 20A, 20B, and 20C. The light control units 20A, 20B, and 20C thereby become opaque sequentially from the light control unit 20A.

According to Modified Example 6 described above, the following effect is obtained.

(13) It is possible to change the light transmittance of each of the plurality of light control units 20A, 20B, and 20C by operation in the detection element group 13A facing the single light control unit 20A.

Third Embodiment

An embodiment that embodies the light control sheet 20 of the first embodiment as a light control sheet including a PNLC-type light control layer, and that embodies the detection sheet 10 of the first embodiment as a surface capacitance-type detection sheet is described as a third embodiment. In the third embodiment, the light-transmissive substrate 25 is omitted from the second embodiment, and the configuration of the detection sheet 10 is significantly different from that of the second embodiment. Accordingly, the configuration of the detection sheet 10 mainly is described below, and the description overlapping with that of the second embodiment is omitted.

Figure 16:
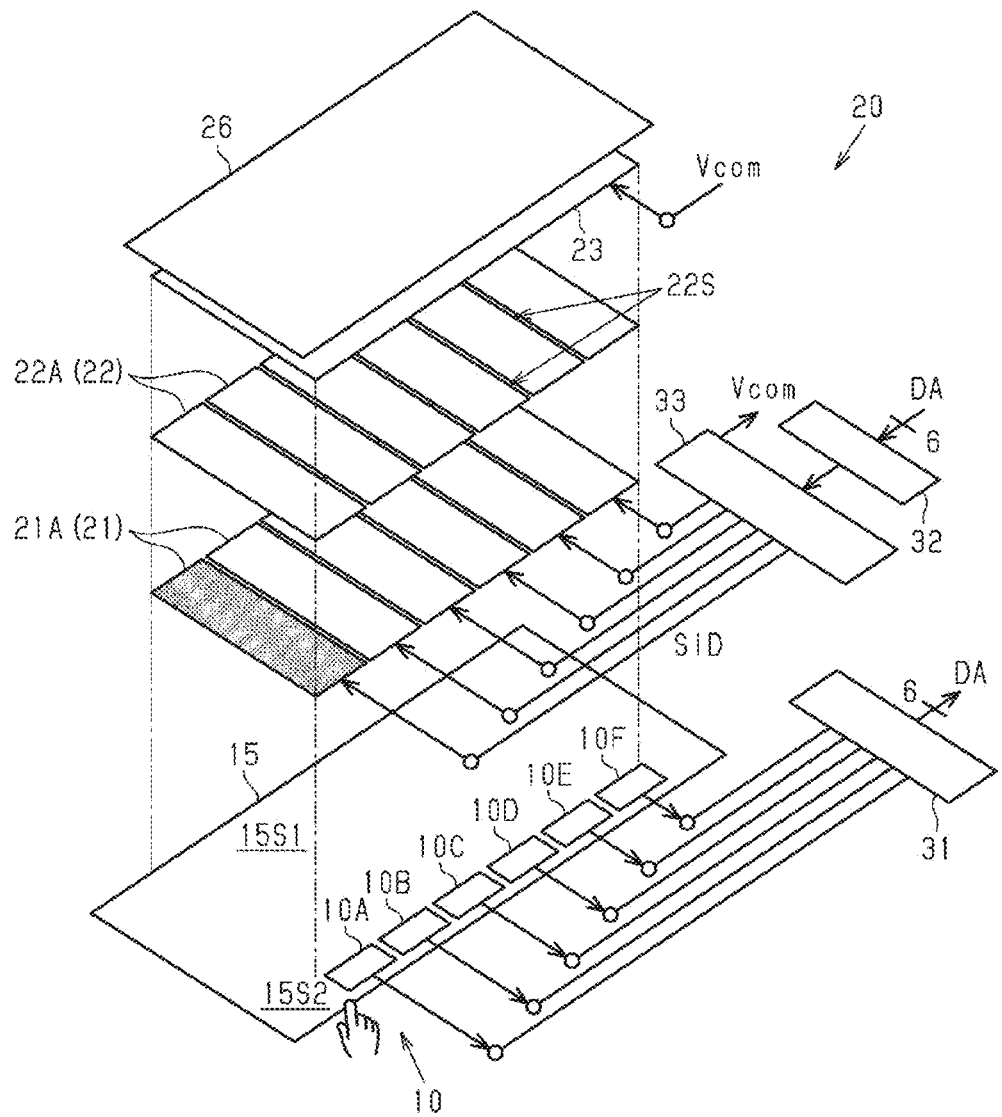
FIG. 16 is an exploded perspective view illustrating the configuration of a light control device in a third embodiment.

As shown in FIG. 16, the light control device includes a detection sheet 10 and a light control sheet 20. The detection sheet 10 includes a substrate sheet 15, which is an insulator having light transmissivity, and six detection units 10A to 10F. The substrate sheet 15 separately includes a first region 15S1 to be bonded to the light control sheet 20, and a second region 15S2 in which the six detection units 10A to 1° F. are positioned.

Light control units in the light control sheet 20 each include one first electrode element 21A for each light control unit, one light control element 22A for each light control unit, and a second electrode layer 23 common to the light control units.

The detection units 10A to 1° F. employ a surface capacitance-type including a single electrode layer. The detection units 10A to 1° F. are arranged along the arrangement direction of the first electrode elements 21A in the light control sheet 20. The detection units 10A to 1° F. are disposed in parallel with the respective light control units for the respective detection units 10A to 10F.

Figure 17A:
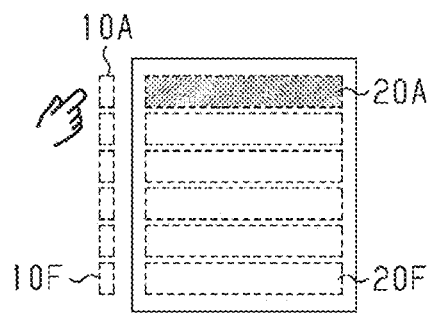
FIGS. 17(a) and 17(b) are a set of action diagrams each illustrating the action of the light control device.
Figure 17B:
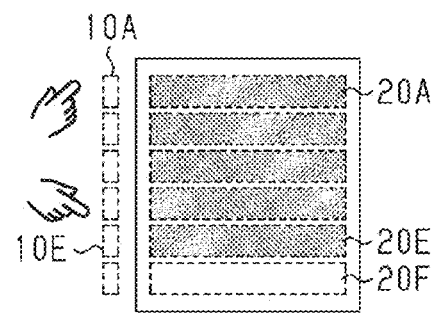

As shown in FIG. 17 (*a*), when the user taps the detection unit 10A in a device state in which the light control units 20A to 20F are transparent, the detection unit 10A detects changes in capacitance, and the other detection units 10B to 1° F. do not detect changes in capacitance. As a result, a change signal SiD is outputted to the light control unit 20A, so that the light control unit 20A changes from transparent to opaque.

Moreover, as shown in FIG. 17 (*b*), when a user's finger slides from the detection unit 10A to the detection unit 10E in a device state in which the light control units 20A to 20F are transparent, the detection units 10A to 10E detect changes in capacitance sequentially from the top. As a result, a change signal SiD is outputted to the light control units 20A to 20E, so that the state of the light control units 20A to 20F changes from transparent to opaque sequentially from the top.

According to the third embodiment, the following effect is obtained.

(14) The detection units 10A to 1° F. and the light control sheet 20 are disposed in parallel to the plane of the substrate sheet 15, which is an insulator. Accordingly, it is also possible to suppress noise contamination in the detection result because the detection units 10A to 1° F. and the light control sheet 20 are superposed.

The third embodiment can also be carried out with the following modifications.

The third embodiment can also be carried out in combination with the first embodiment and the modified examples thereof where appropriate.

In terms of increasing the rigidity of the light control device, the light control device according to the third embodiment can include the light-transmissive substrate 25 according to the second embodiment. Moreover, in terms of increasing the durability of the light control sheet 20, the substrate sheet 15 and other members in the light control device according to the third embodiment can also have gas barrier function and UV barrier function, as in the second embodiment.

The present application addresses the following. In various light control devices, it is desirable to change the light transmittance of the light control sheets by intuitive operation, in terms of increasing the usability of the light control devices.

An aspect of the present invention is to provide a light control device that can change the light transmittance of a light control sheet by intuitive operation.

The light control device includes a light control sheet that includes a plurality of light control units each configured to reversibly change light transmittance, the plurality of light control units being arranged according to a first arrangement that has specific regularity; a detection sheet that includes a plurality of detection units each configured to detect external input, the plurality of detection units being arranged according to a second arrangement that has the same regularity as the regularity of the first arrangement; a driving unit that outputs a change signal for changing the light transmittance to each of the light control units; and a light control processing unit that associates each of the detection units with at least one of the light control units, and that causes the driving unit to output the change signal to the light control unit associated with the detection unit that has detected the external input.

The phrase that "the regularity of the Mth arrangement is the same as the regularity of the Nth arrangement" means at least one of the following: 1) the arrangement direction of elements M arranged according to the Mth arrangement is the same as the arrangement direction of elements N arranged according to the Nth arrangement; 2) the relative size relationship of the elements M with respect to the arrangement order of the elements M is the same as the relative size relationship of the elements N with respect to the arrangement order of the elements N; and 3) the relative positional relationship of the elements M with respect to the arrangement order of the elements M is the same as the relative positional relationship of the elements N with respect to the arrangement order of the elements N.

According to the above light control device, external input detected by an input target is converted into changes in light transmittance in an output target. In this case, because the regularity of the arrangement of the light control units in the light control sheet is the same as the regularity of the arrangement of the detection units in the detection sheet, it is possible to associate the input part in the light control sheet with the output part in the detection sheet. Therefore, the light transmittance of the light control sheet can be changed by intuitive operation.

The above light control device includes a light-transmissive substrate having two support surfaces that face each other, and the light control sheet includes a first electrode layer having light transmissivity, a second electrode layer having light transmissivity, and a light control layer sandwiched between the first electrode layer and the second electrode layer. The detection units may have light transmissivity and be positioned on one of the support surfaces, the light control units may be positioned on the other support surface and face the detection units, and the light-transmissive substrate may be an insulator having a thickness of 0.5 mm or more.

Since the electrode layer provided in the light control sheet and the detection units provided in the detection sheet face each other, the electrode layer, which is a conductor, easily transmits external electrical noise received thereby to the detection units facing the electrode layer. In this respect, according to the above light control device, because the light-transmissive substrate positioned between the detection units and the light control units is an insulator having a thickness of 0.5 mm or more, the detection units are less likely to detect electrical noise in the electrode layer. As a result, even in a configuration in which the detection units and the light control units face each other to further facilitate intuitive operation, desired accuracy can be obtained for the results detected by the detection units.

In the above light control device, the detection sheet may include a plurality of detection elements each configured to detect changes in capacitance; the plurality of detection elements may include a plurality of adjacent detection element groups, each of which is a set of the detection elements; the light control processing unit may further include a storage unit that stores data for associating each of the detection elements with the detection element group to which the detection element belongs; the light control processing unit may perform creation processing to create the data, and general processing; in the general processing, each of the detection element groups may be associated with a corresponding one of the detection units based on the data in processing of associating each of the detection units with at least one of the light control units; and in the creation processing, one of the light control units may be driven into a visible state, and the data may be created so as to associate the detection element group to which the detection element that has detected the changes in capacitance belongs with the detection unit associated with the light control unit driven into the visible state.

According to the above light control device, the light control unit driven into a visible state is associated with the detection element group for outputting a change signal to the light control unit, by creation processing performed by the light control processing unit. As a result, even if deviation occurs in the position etc. in the light control device between the previously set regularity of the arrangement of the detection units and the regularity of the arrangement of the light control units, the arrangement having the same regularity as the regularity of the arrangement of the light control units can be calibrated to the actual arrangement of the detection units. As a result, it is possible to increase the accuracy of changing the light transmittance of the light control sheet by intuitive operation.

In the above light control device, the detection sheet may include a plurality of detection elements each configured to detect changes in capacitance; the plurality of detection elements may include a plurality of adjacent detection element groups, each of which is a set of the detection elements; the plurality of detection element groups may be arranged according to a third arrangement that has the same regularity as the regularity of the second arrangement; the light control processing unit may further include a storage unit that stores data for associating each of the detection elements with a corresponding one of the detection element groups, the data defining at least one of the detection elements that is not associated with any of the detection element groups and is located between the adjacent detection element groups; and in processing of associating each of the detection units with at least one of the light control units, the light control processing unit may associate each of the detection element groups with a corresponding one of the detection units based on the data.

According to the above light control device, because the detection element groups constituted from a plurality of detection elements can each function as a single detection unit, it is possible to increase the positional resolution for detecting changes in capacitance. In addition, detection elements that do not belong to any of the detection element groups are positioned between the adjacent detection element groups. Changes in capacitance in areas between the adjacent detection element groups are excluded from detection by each detection element group. Accordingly, it is possible to suppress erroneous detection in areas between the adjacent detection element groups.

In the above light control device, the light control processing unit may include a storage unit that stores a plurality of input patterns as patterns of changes in the external input in association with the change signal corresponding to one of the input patterns; and the light control processing unit may identify an input pattern corresponding to a pattern of changes in the external input detected by the detection unit, from the plurality of input patterns stored in the storage unit, and may cause the driving unit to output the change signal corresponding to the identified input pattern.

According to the above light control device, changes in external input detected by the detection unit are identified as any of the plurality of input patterns, and the driving unit outputs a change signal corresponding to the identified input pattern. Accordingly, driving of the light control units in a plurality of different modes can be achieved by changes in external input in the single detection unit, for example, one input made by the user.

In the above light control device, the detection sheet may include a plurality of detection elements each configured to detect changes in capacitance; each of the detection units may include a group of the detection elements; the light control processing unit may include a storage unit that stores a specific pattern of the changes in capacitance in the group of the detection elements as an input pattern; and the light control processing unit may set a pair of the light control units as a target to which the light control processing unit causes the driving unit to output the change signal, and may cause, when a pattern of the changes in capacitance detected by the detection unit is the input pattern, the driving unit to output the change signal corresponding to the input pattern to the pair of the light control units.

According to the above light control device, the light control processing unit handles changes in capacitance detected by a plurality of detection elements as an input pattern, and causes the driving unit to output a change signal corresponding to the input pattern to a plurality of light control units. Accordingly, driving of a plurality of light control units can be achieved by changes in capacitance in a plurality of detection elements, for example, from one input made by the user.

In the above light control device, the light control units may contain a liquid crystal composition, and the light control device may further include a barrier layer that suppresses at least one of contact between the liquid crystal composition and atmospheric air, and entry of ultraviolet rays into the liquid crystal composition.

According to the above light control device, it is possible to lengthen the life of the liquid crystal composition contained in the light control units by the function of the barrier layer.

In the above light control device, the light control sheet may include a first electrode layer having light transmissivity, a second electrode layer having light transmissivity, and a light control layer containing a liquid crystal composition and sandwiched between the first electrode layer and the second electrode layer; at least one of the first electrode layer and the second electrode layer may be an input target layer; the input target layer may include a plurality of electrode elements; the plurality of electrode elements may be arranged according to a fourth arrangement that has the same regularity as the regularity of the first arrangement; the input target layer may further include a terminal part positioned at the edge of the input target layer, and a wiring layer connected to the electrode elements; a direction orthogonal to the extending direction of the wiring layer is a width direction, and the width of the wiring layer in the width direction may be smaller than the width of the electrode elements; and the change signal may be a voltage signal that, when supplied to the light control units, changes the orientation of the liquid crystal composition facing the electrode elements while allowing the orientation of the liquid crystal composition facing the wiring layer to be the same as before the output of the change signal.

The wiring layer for applying voltage to the electrode elements is required to have various shapes and positions based on the relative relationship between the position of each electrode element and the position of the driving unit. According to the above light control device, the light transmittance of portions of the light control sheet facing the electrode elements is changed, while the light transmittance of a portion of the light control sheet facing the wiring layer is maintained. Therefore, the light transmittance can be prevented from changing only in the position facing the wiring layer, that is, the light transmittance can be prevented from changing in a portion less relevant to intuitive operation.

In the above light control device, the plurality of electrode elements may include a first electrode element and a second electrode element that surrounds the first electrode element, and the wiring layer may be connected to the first electrode element and the terminal part.

According to the above light control device, the light control unit including the second electrode element has an annular shape, and the light control unit including the first electrode element has a shape surrounded by the annular shape. Input that changes the light transmittance of the area facing the first electrode element is intended to change the light transmittance of only the annularly surrounded area. Therefore, it is more useful to suppress changes in light transmittance outside the annularly surrounded area, that is, changes in light transmittance in the position facing the wiring layer.

REFERENCE SIGNS LIST

SiA . . . Detection signal
10 . . . Detection sheet
20 . . . Light control sheet
10A, 10B, 10C, 10D, 10E, 10F, 10G, 10H . . . Detection unit
20A, 20B, 20C, 20D, 20E, 20F, 20G, 20H Light control unit
31 . . . Input position determination unit
32 . . . Change position specifying unit
33 . . . Driving unit Obviously, numerous modifications and variations of the present invention are possible in light of the above teachings. It is therefore to be understood that within the scope of the appended claims, the invention may be practiced otherwise than as specifically described herein.

What is claimed is:
1. A light control device, comprising:
a light control sheet including a plurality of light control circuits each configured to reversibly change light transmittance and positioned according to a first arrangement that has a regularity;
a detection sheet including a plurality of detection circuits each configured to detect an external input and positioned according to a second arrangement that has a regularity same as the regularity of the first arrangement;
driving circuitry configured to output, to each of the light control circuits, a change signal for changing light transmittance; and
light control processing circuitry including a plurality of light control processing circuits configured to associate each of the detection circuits with at least one of the light control circuits, and cause the driving circuitry to output the change signal to the light control circuits associated with the detection circuits that have detected the external input, wherein
each light control processing circuit is configured to cause the driving circuitry to output a unique change signal corresponding to an identified input pattern.

2. The light control device of claim 1, further comprising:
a light-transmissive substrate which is an insulator having a thickness of 0.5 mm or more and positioned between the light control sheet and the detection sheet,
wherein the light control sheet includes a first electrode layer having light transmissivity, a second electrode layer having light transmissivity, and a light control layer sandwiched between the first electrode layer and the second electrode layer,
the light control circuits are formed on one side of the light-transmissive substrate, and
the detection circuits having light transmissivity are formed on another side of the light-transmissive substrate such that the detection circuits and the light control circuits are located at positions corresponding to one another.

3. The light control device of claim 2, wherein
the detection sheet includes plurality of detection elements each configured to detect change in capacitance,
the detection elements are grouped into a plurality of detection element groups to which a set of the detection elements adjacent to one another belong,
each light control processing circuit includes storage circuitry configured to store data for associating each of the detection elements with one of the detection element groups to which the detection elements belong,
each light control processing circuit is configured to perform general processing which associates each of the detection element groups with a corresponding one of the detection circuits based on the data stored in the storage circuitry in a process of associating each of the detection circuits with at least one of the light control circuits, and
each light control processing circuit is configured to perform creation processing which drives one of the light control circuits into a visible state and creates data to associate the detection element groups, to which the detection elements that have detected the change in capacitance belong, with the detection circuits associated with the light control circuits driven into the visible state.

4. The light control device of claim 2, wherein
the detection sheet includes a plurality of detection elements each configured to detect change in capacitance,
the detection elements are grouped into a plurality of detection element groups to Which a set of the detection elements adjacent to one another belong,
the detection element groups are positioned according to a third arrangement that has a regularity same as the regularity of the second arrangement,
each light control processing unit circuit includes storage circuitry configured to store data for associating each of the detection elements with a corresponding one of the detection element groups, and specifying at least one of the detection elements which is located between the detection element groups and not associated with any, of the detection element groups, and
each light control processing circuit is configured to associate each of the detection element groups with a corresponding one of the detection circuits based on the data in a process of associating each of the detection circuits with at least one of the light control circuits.

5. The light control device of claim 2, wherein
each light control processing unit circuit includes a storage circuitry configured to store a plurality of input patterns as patterns of change in the external input such that the input patterns each correspond to the unique Change signal, and each light control processing circuit is configured to
identify, from the input patterns stored in the storage
circuitry, an input pattern corresponding to a pattern of
change in the external input detected by the detection
circuits.

6. The light control device of claim 2, wherein
the detection sheet includes a plurality of detection elements each configured to detect change in capacitance,
each of the detection circuits include a group of the detection elements,
each light control processing circuit includes storage circuitry configured to store a pattern of change in capacitance in the group of the detection elements as an input pattern,
each light control processing circuit is configured to set a pair of the light control circuits as a target to which the light control processing circuit causes the driving circuitry to output the change signal, and
each light control processing circuit is configured such that when a pattern of change in capacitance detected by the detection circuits is the input pattern stored in the storage circuitry, the driving circuitry is caused to output the change signal corresponding to the input pattern to the pair of the light control circuits.

7. The light control device of claim 1, wherein
the detection sheet includes a plurality of detection elements each configured to detect change in capacitance,
the detection elements are grouped into a plurality of detection element groups to which a set of the detection elements adjacent to one another belong,
each light control processing circuit includes storage circuitry configured to store data for associating each of the detection elements with one of the detection element groups to which the detection elements belong,
each light control processing circuit is configured to perform general processing which associates each of the detection element groups with a corresponding one of the detection circuits based on the data stored in the storage circuitry in a process of associating each of the detection circuits with at least one of the light control circuits, and
each light control processing circuit is configured to perform creation processing winch drives one of the light control circuits into a visible state and creates data to associate the detection element groups, to which the detection elements that have detected the change in capacitance belong, with the detection circuits associated with die light control circuits driven into the visible state.

8. The light control device of claim 1, wherein
the detection sheet includes a plurality of detection elements each configured to detect change in capacitance,
the detection elements are grouped into a plurality of detection element groups to which a set of the detection elements adjacent to one another belong,
the detection element groups are positioned according to a third ran tent that has a regularity same as the regularity of the second arrangement,
each light control processing circuit includes storage unit circuitry configured to store data for associating each of the detection elements with a corresponding one of the detection element groups, and specifying at least one of the detection elements which is located between the detection element groups and not associated with any of the detection element groups, and
each hat control processing circuit is configured to associate each of the detection element groups with a corresponding one of the detection circuits based on the data in a process of associating each of the detection circuits with at least one of the light control circuits.

9. The light control device of claim 1, wherein
each light control processing unit circuit includes a storage unit circuitry configured to store a plurality of input patterns as patterns of change in the external input such that the input patterns each correspond to the unique change signal, and
each light control processing circuit is configured to ident from the input patterns stored in the storage circuitry, an input pattern corresponding to a pattern of change in the external input detected by the detection circuits.

10. The light control device of claim 1, wherein
the detection sheet includes a plurality of detection elements each configured to detect change in capacitance,
each of the detection circuits include a group of the detection elements,
each light control processing circuit includes storage circuitry configured to store a pattern of change in capacitance in the group of the detection elements as an input pattern,
each light control processing circuit is configured to set a pair of the light control circuits as a target to which the light control processing circuit causes the driving circuitry to output the change signal, and
each light control processing circuit is configured such that when a pattern of change in capacitance detected by the detection circuits is the input pattern stored in the storage circuitry, the driving circuitry is caused to output the change signal corresponding to the input pattern to the pan of the light control circuits.

11. The light control device of claim 1, further comprising:
a barrier layer,
wherein the light control circuits each comprise a liquid crystal composition, and the barrier layer is formed such that the bather layer suppresses at least one of a contact between the liquid crystal composition and atmospheric air, and an entry of ultraviolet rays into the liquid crystal composition.

12. The light control device of claim 1, wherein
the light control sheet includes a first electrode layer having light transmissivity, a second electrode layer having light transmissivity, and a light control layer comprising a liquid crystal composition and sandwiched between the first electrode layer and the second electrode layer,
at least one of the first electrode layer and the second electrode layer is an input target layer including a plurality, of electrode elements positioned according to a fourth arrangement having a regularity same as the regularity of the first arrangement
the input target layer includes a terminal part positioned at an edge of the input target layer, and a wiring layer connected to the electrode elements and extended in an extending direction orthogonal to a width direction,
the wiring layer has a width smaller than a width of the electrode elements,
the light control circuits each include the liquid crystal composition having an orientation changeable by the change signal which is a voltage signal, and
when the change signal is supplied to the light control circuits, the change signal changes the orientation of the liquid crystal composition facing the electrode elements and does not change the orientation of the liquid crystal composition facing the wiring layer.

13. The light control device of claim 12, wherein,
the electrode elements include a first electrode element and a second electrode element that surrounds the first electrode element, and
the wiring layer is connected to the first electrode element and the terminal part.

\* \* \* \* \*